United States Patent
Denson

(10) Patent No.: US 9,649,971 B2
(45) Date of Patent: May 16, 2017

(54) TWISTLOCK ASSEMBLY AND METHOD FOR COUPLING A TWISTLOCK TO A SHIPPING UNIT

(71) Applicant: Fontaine Engineered Products, Inc., Jasper, AL (US)

(72) Inventor: John Clifford Denson, Birmingham, AL (US)

(73) Assignee: Fontaine Engineered Products, Inc., Jasper, AL (US)

( * ) Notice: Subject to any disclaimer, the term of this patent is extended or adjusted under 35 U.S.C. 154(b) by 0 days.

(21) Appl. No.: 14/680,616

(22) Filed: Apr. 7, 2015

(65) Prior Publication Data

US 2016/0297349 A1    Oct. 13, 2016

(51) Int. Cl.
| | | |
|---|---|---|
| *B60P 7/13* | (2006.01) | |
| *B65D 88/12* | (2006.01) | |
| *B65D 88/52* | (2006.01) | |
| *B65D 90/00* | (2006.01) | |

(52) U.S. Cl.
CPC ............ *B60P 7/132* (2013.01); *B65D 88/129* (2013.01); *B65D 88/522* (2013.01); *B65D 90/0013* (2013.01)

(58) Field of Classification Search
CPC .. B60P 7/132; B60P 7/135; B60P 7/13; B65D 88/129; B65D 88/022; B65D 88/522; B65D 90/0013; B65D 90/0026; B65D 90/0033
USPC .............................................. 410/46, 82, 83
See application file for complete search history.

(56) References Cited

U.S. PATENT DOCUMENTS

| | | | |
|---|---|---|---|
| 3,188,042 A | | 6/1965 | Watters |
| 3,507,224 A | | 4/1970 | Sweger |
| 3,507,226 A | | 4/1970 | Nadherny |
| 3,529,741 A | | 9/1970 | Walker et al. |
| 3,545,713 A | | 12/1970 | Hamilton et al. |
| 3,586,286 A | | 6/1971 | Pratt |
| 3,621,236 A | | 11/1971 | Hlinsky et al. |
| 3,643,906 A | | 2/1972 | Werner et al. |
| 3,717,372 A | * | 2/1973 | Carr ........................ B60P 7/132 410/82 |
| 3,734,445 A | | 5/1973 | Werner et al. |
| 3,768,857 A | | 10/1973 | Horton |
| 3,866,970 A | | 2/1975 | Schwiebert |
| 4,092,040 A | | 5/1978 | Tatina |
| 4,131,071 A | | 12/1978 | Glassmeyer |

(Continued)

*Primary Examiner* — Patrick Hawn
(74) *Attorney, Agent, or Firm* — Andrus Intellectual Property Law, LLP

(57) ABSTRACT

A twistlock assembly includes a twistlock having a housing extending along a twistlock axis. A pin is coupled to the housing at a location lateral to the twistlock axis and extends along a pin axis. A pin supporting member is arranged coaxially with the pin, which is slideable along the pin axis with respect to the supporting member. The supporting member is coupled to a shipping unit proximate a female fitment having an aperture. By sliding the pin along the pin axis and rotating the twistlock around the pin axis, the twistlock is moved from a use position in which the twistlock axis is aligned with the aperture and the twistlock is seated on the fitment, to a stowed position in which the twistlock axis is located laterally with respect to the aperture and the twistlock is coupled to the shipping unit by way of the pin and supporting member.

20 Claims, 6 Drawing Sheets

(56) References Cited

U.S. PATENT DOCUMENTS

| | | | |
|---|---|---|---|
| 4,591,307 A | 5/1986 | Clive-Smith | |
| 4,758,123 A | 7/1988 | Corompt | |
| 5,012,999 A | 5/1991 | Donnard | |
| 5,755,472 A | 5/1998 | Clive-Smith | |
| 5,931,617 A | 8/1999 | Kroll et al. | |
| 6,164,862 A | 12/2000 | Takaguchi | |
| 6,210,088 B1 | 4/2001 | Crosby | |
| 6,572,325 B2 * | 6/2003 | Kelly | B65D 88/022 220/1.5 |
| 6,622,640 B2 * | 9/2003 | Taylor | B64D 9/00 108/55.5 |
| 7,883,305 B2 | 2/2011 | Watson | |
| 8,342,784 B2 | 1/2013 | Crane et al. | |
| 8,608,415 B2 * | 12/2013 | Crane | B61D 47/00 410/46 |
| 8,678,727 B2 | 3/2014 | Crane | |
| 8,714,895 B2 * | 5/2014 | Crane | B65D 88/129 410/46 |
| 8,757,943 B2 * | 6/2014 | Crane | B65D 88/129 410/46 |
| 9,227,756 B2 * | 1/2016 | Crane | B61D 47/00 |
| 2013/0089387 A1 * | 4/2013 | Crane | B61D 47/00 410/46 |
| 2014/0161555 A1 | 6/2014 | Adams | |

* cited by examiner

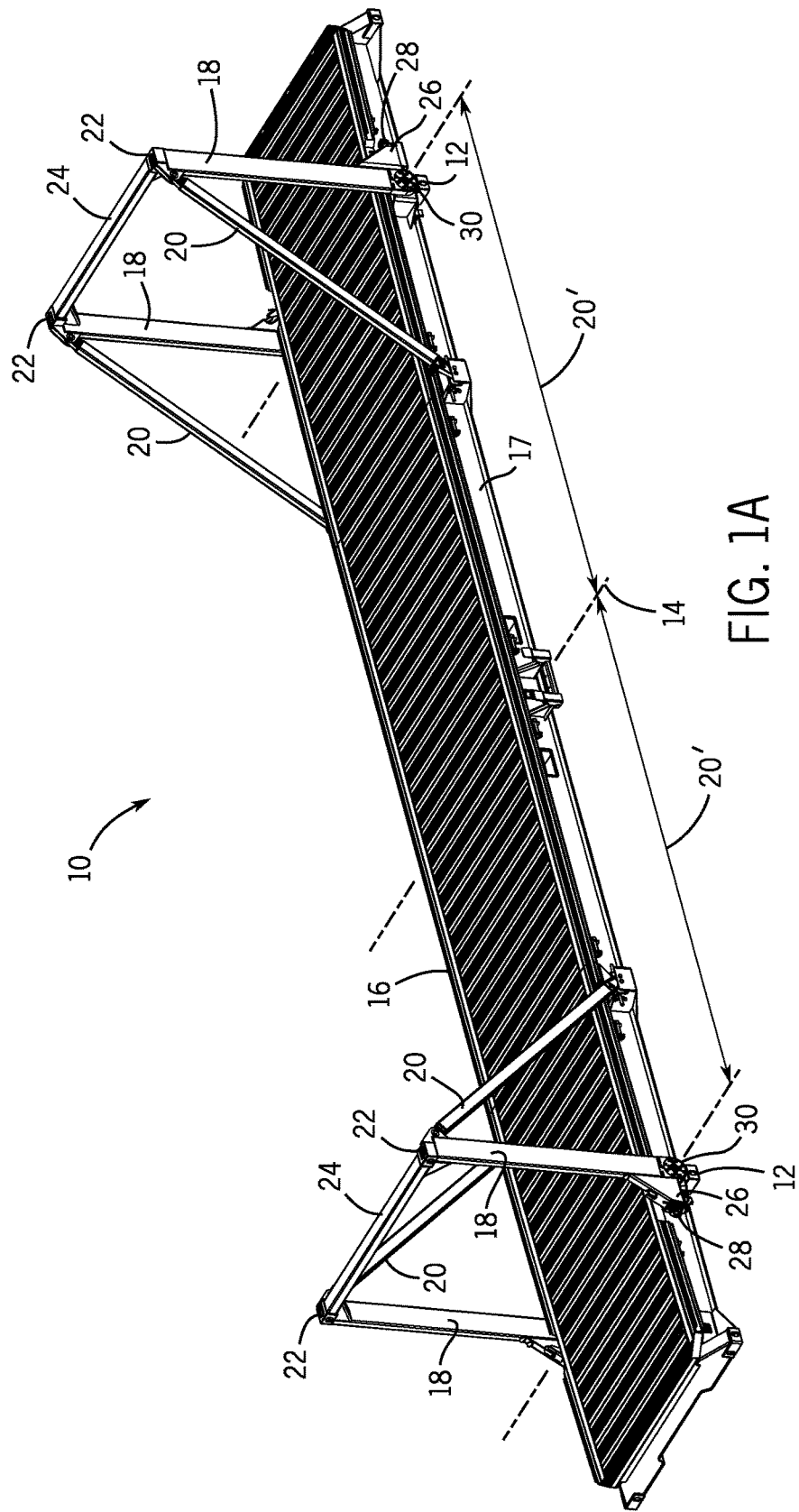

TWISTLOCK ASSEMBLY AND METHOD FOR COUPLING A TWISTLOCK TO A SHIPPING UNIT

FIELD

The present disclosure relates to shipping units, such as cargo carriers, flatracks, intermodal shipping containers, etc. More specifically, the present disclosure relates to twistlocks for coupling two or more of such shipping units to one another.

BACKGROUND

U.S. Pat. No. 4,591,307 discloses a cargo carrier that has a frame on which a hollow portion is provided, the hollow portion having a surface with an aperture therein locating device, such as a twistlock or location cone, is provided. The locating device can move between a raised position in which a first portion of the device projects through the aperture, and a lowered position in which the first portion is below the apertured surface. In this position a second portion of the locating device defines one end of the aperture in the surface and is effective to guide handling equipment into engagement with the cargo carrier through the aperture. The surface of the second portion of the device is preferably complimentary to the peripheral edge of the opposite end of the aperture.

U.S. Pat. No. 5,755,472 discloses a platform based shipping container with folding endwalls which enable the empty container to be stacked up with a pile of similar folded containers for economical transport. There is a twistlock at each corner to interlock folded containers together and a top lift aperture at each corner to enable the pile to be lifted from above. At least one endwall can also fold outwardly away from the base to provide a ramp for the loading of vehicles. The endwalls are resiliently biased to provide for folding in either direction.

U.S. Pat. No. 8,342,784 discloses a collapsible intermodal transport platform and methods for its operation. The invention comprises structural ribbings that rotate about an axle disposed beneath the loading surface of the platform. The ribbings are positioned along the platform so as to provide lifting and stacking fitments at the standard overhead crane lifting points when in a lift configuration. The ribbings may be rotated inboard down to the loading surface, thereby presenting stacking blocks at the crane lifting points for stacking several platforms together. Alternatively, the ribbings may be rotated outboard to accommodate full size loading of cargo. The ribbings are rotated under electric or hydraulic power, according to the various embodiments disclosed. Other features and aspects disclosed lend to the invention's low weight and high carrying capacity, as well as its unique load securing features.

U.S. Pat. No. 8,678,727 discloses a stacking and lifting system for intermodal transport platforms. Transport platforms can be converted between a storage or empty transport position and a haul or load position through rotation of support posts that provide structural support and locate fitments that align with adjoining fitments on standard intermodal containers. The support posts have fitments at their distal ends for use during lifting or stacking operations when the transport platform is loaded and in use. The support posts also have stacking blocks that provide flip-up fitments for use when the posts are in a lowered configuration for stacking transport platforms with other transport platforms or with standard intermodal containers. The stacking blocks may be lifted directly or may be locked in to adjoining fitment housings, such that the transport platform will cling to the adjoining platform or intermodal container above it that is being lifted.

U.S. Patent Publication No. 2014/0161555, which is hereby incorporated herein by reference, discloses a collapsible intermodal flat rack that features a cargo deck with first and second arches pivotally mounted to the cargo deck. Each arch is provided with a crank mechanism including a gearbox having an input shaft and an output shaft. The output shaft is attached to the corresponding arch so that the arch may be moved between a storage position, where a top portion of the arch is located adjacent to the cargo deck, and a use position, where the top portion of the arch is elevated from the cargo deck, by actuation of the input shaft.

SUMMARY

The present disclosure is of a twistlock assembly including a twistlock having a housing extending along a twistlock axis. A pin is coupled to the housing at a location lateral to the twistlock axis and extends along a pin axis. A pin supporting member is arranged coaxially with the pin, and the pin is slideable along the pin axis with respect to the pin supporting member. The pin supporting member is configured to be coupled to a shipping unit proximate a female fitment located thereon and having an upwardly-facing aperture. By sliding the pin along the pin axis and rotating the twistlock around the pin axis, the twistlock can be moved from a use position in which the twistlock axis is aligned with the aperture and the twistlock is seated on the fitment, to a stowed position in which the twistlock axis is located laterally with respect to the aperture and the twistlock is coupled to the shipping unit by way of the pin and the pin supporting member.

In another example, a method for coupling a twistlock to a shipping unit is provided. The method includes providing a twistlock having a housing extending along a twistlock axis and coupling a pin to the housing at a location lateral to the twistlock axis, the pin extending along a pin axis. The method also includes locating a female fitment having an upwardly-facing aperture on the shipping unit and coupling a pin supporting member to the shipping unit proximate the fitment. The method also includes arranging the pin coaxially with the pin supporting member such that the pin is slideable along the pin axis with respect to the pin supporting member. By sliding the pin along the pin axis and rotating the twistlock around the pin axis, the twistlock can be moved from a use position in which the twistlock axis is aligned with the aperture and the twistlock is seated on the fitment, to a stowed position in which the twistlock axis is located laterally with respect to the aperture and the twistlock is coupled to the shipping unit by way of the pin and the pin supporting member.

Another example is of an intermodal flatrack comprising a main platform for holding cargo and a female fitment coupled to the main platform and having an upwardly-facing aperture. The flatrack also includes a twistlock assembly comprising a twistlock having a housing extending along a twistlock axis; a pin coupled to the housing at a location lateral to the twistlock axis, the pin extending along a pin axis; and a pin supporting member arranged coaxially with the pin, the pin being slideable along the pin axis with respect to the pin supporting member. The pin supporting member is coupled to the flatrack proximate the fitment. By sliding the pin along the pin axis and rotating the twistlock around the pin axis, the twistlock can be moved from a use position in which the twistlock axis is aligned with the aperture and the twistlock is seated on the fitment, to a stowed position in which the twistlock axis is located laterally with respect to the aperture and the twistlock is coupled to the flatrack by way of the pin and the pin supporting member.

BRIEF DESCRIPTION OF THE DRAWINGS

FIG. 1A illustrates one example of a shipping unit, where the shipping unit is an intermodal flatrack.

DETAILED DESCRIPTION

Figure 1B:
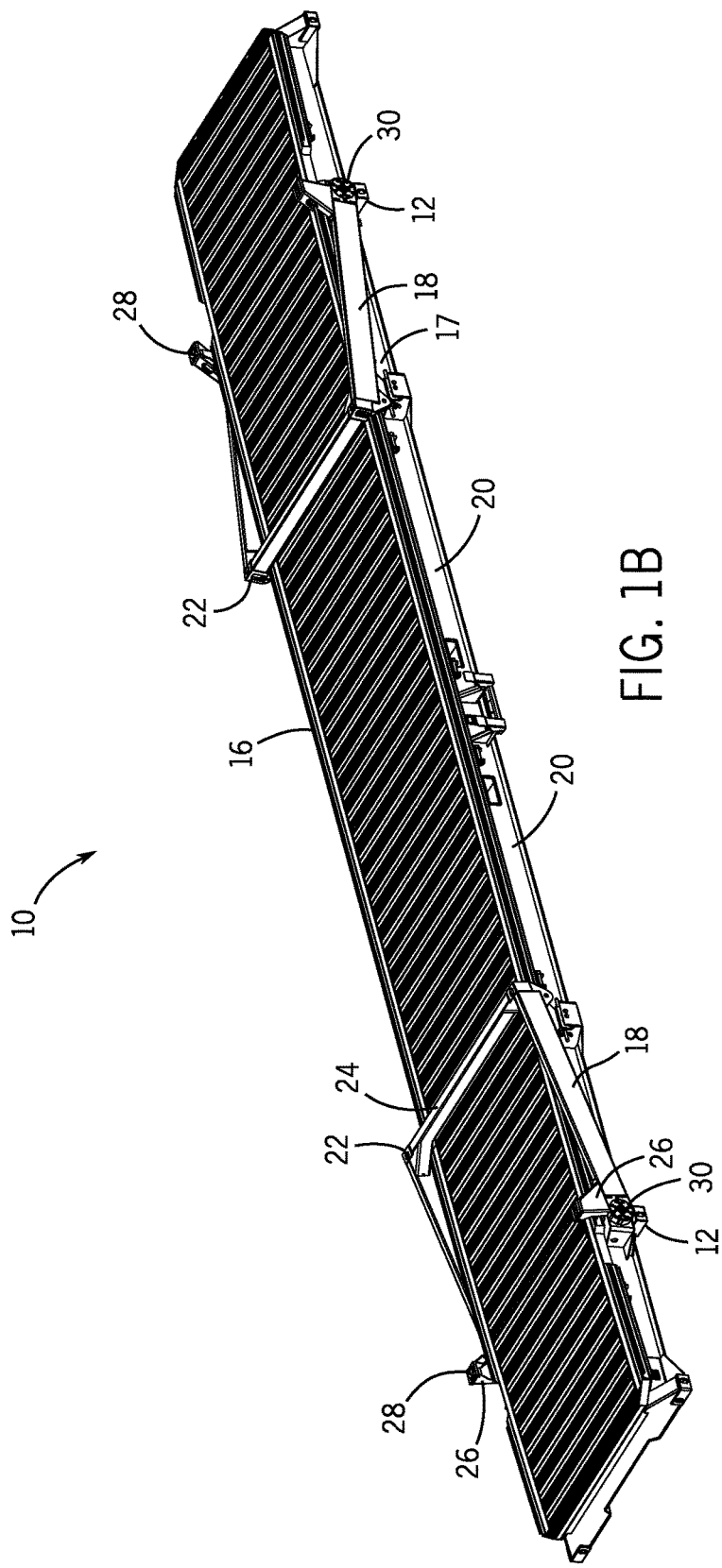
FIG. 1B illustrates the intermodal flatrack of FIG. 1A in a collapsed position.

FIGS. 1A and 1B illustrate one example of a shipping unit, in which the shipping unit is an intermodal flatrack 10. Those having skill in the art will understand that the flatrack 10 having is considered to be "intermodal" because it may be shipped via a variety of different modes of transportation, such as by rail, by water, or by truck. Flatrack 10 shown in FIGS. 1A and 1B comprises a main platform 16 supported by longitudinal beams 17. According to international shipping standards, the flatrack 10 is provided with downwardly-facing female fitments 12, two of which are shown in FIG. 1A, that are spaced generally 20 feet on either side of a centerline 14 of the flatrack 10. This 20-foot-from-center spacing accords with an ISO standard that stacking and lifting fitments on an intermodal container be placed at 40-foot increments so that a standard crane can be used to lift the shipping unit. The fitments 12 are coupled to the longitudinal beams 17, such as for example by a webbed flange piece. On either side of the centerline 14, the flatrack 10 has a pair of upright posts 18 braced by diagonally extending braces 20, each of which are coupled to an outer surface of the longitudinal beams 17. Additionally, standard female ISO lifting fitments 22 are provided at the top end of each post 18. Lateral beams 24 may be provided to link the top ends of posts 18 to provide strength and stability.

Figure 2:
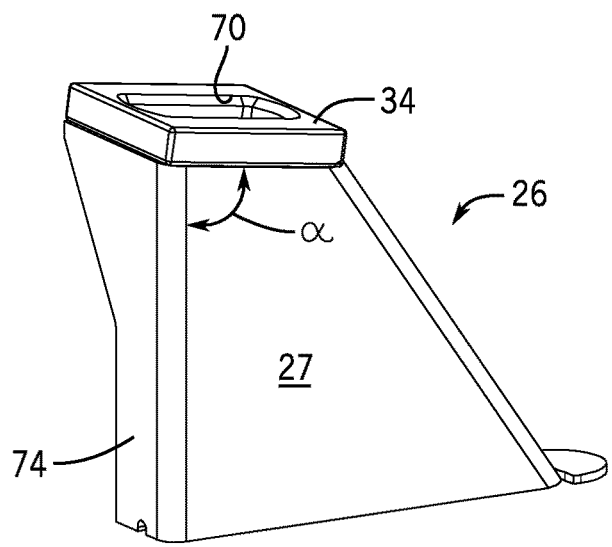
FIG. 2 illustrates one example of a stacking unit with a female fitment.

The posts 18 can be rotated about a pivot 30 provided at the bottom of each post 18 to the collapsed position shown in FIG. 1B. A stacking unit 26 may be provided at the lower end of each post 18, which stacking unit 26 may be provided with an area for a twistlock 28 to be coupled thereto. Referring to FIG. 2, the stacking unit 26 may comprise an irregularly trapezoidal shaped base 27 having a side vertical face 74, which together support a female fitment 34 thereupon. The female fitment 34 may have an aperture 70 for insertion of a crane hook or alternatively part of the twistlock 28 (see also FIG. 6). When the posts 18 are folded down alongside the platform 16 as shown in FIG. 1B, the aperture 70 is an upwardly-facing aperture (i.e., is oriented as shown in FIG. 2). The location of the stacking units 26 when the posts 18 are in the collapsed position provides these upwardly-facing apertures at the standard 40-foot points. Although not shown herein, the far side of the flat rack also has longitudinal beam 17, fitments 12, pivots 30, stacking units 26, and twistlocks 28, thereby providing four stacking areas at the 40-foot points. The four stacking units 26 and associated twistlocks 28 therefore allow one flatrack 10 to be stacked on top of another flatrack 10. For example, the lower downwardly-facing fitments 12 of a first upper flatrack 10 could be positioned on top of twistlocks 28 inserted in the apertures 70 of the stacking units 26 of a second lower collapsed flatrack 10. The upper flatrack can then be held to the lower collapsed flatrack by actuation of the twistlocks 28 within downwardly-facing apertures of the fitments 12 and the upwardly-facing apertures 70 of the fitments 34.

Details of the flatrack 10 and its ability to collapse and stack with other flatracks or shipping units are described in U.S. Patent Publication No. 2014/0161555, which was incorporated by reference above, and will therefore not be described further herein.

Turning to FIGS. 3A-6, the present disclosure is of a twistlock assembly 32 that can be used to couple the twistlock 28 to a shipping unit proximate a female fitment (such as a lifting fitment) provided on the shipping unit. In the examples shown in FIGS. 5A-E and 6, the twistlock assembly 32 is shown as being coupled proximate the female fitment 34 provided on a stacking unit 26; however, it should be understood that the twistlock assembly 32 could be provided proximate any female fitment of the flatrack 10, such as for example the lifting fitments 22 at the top of posts 18 (FIGS. 1A and 1B). Additionally, it should be understood that the flatrack 10 is not the only example in which the twistlock assembly 32 of the present disclosure could be used. For example, the twistlock assembly 32 could be coupled to a main beam of a different type of flatrack, to a pallet, to a box-like cargo container, or to any type of shipping unit having a female lifting fitment.

Figures 3A, 3B:
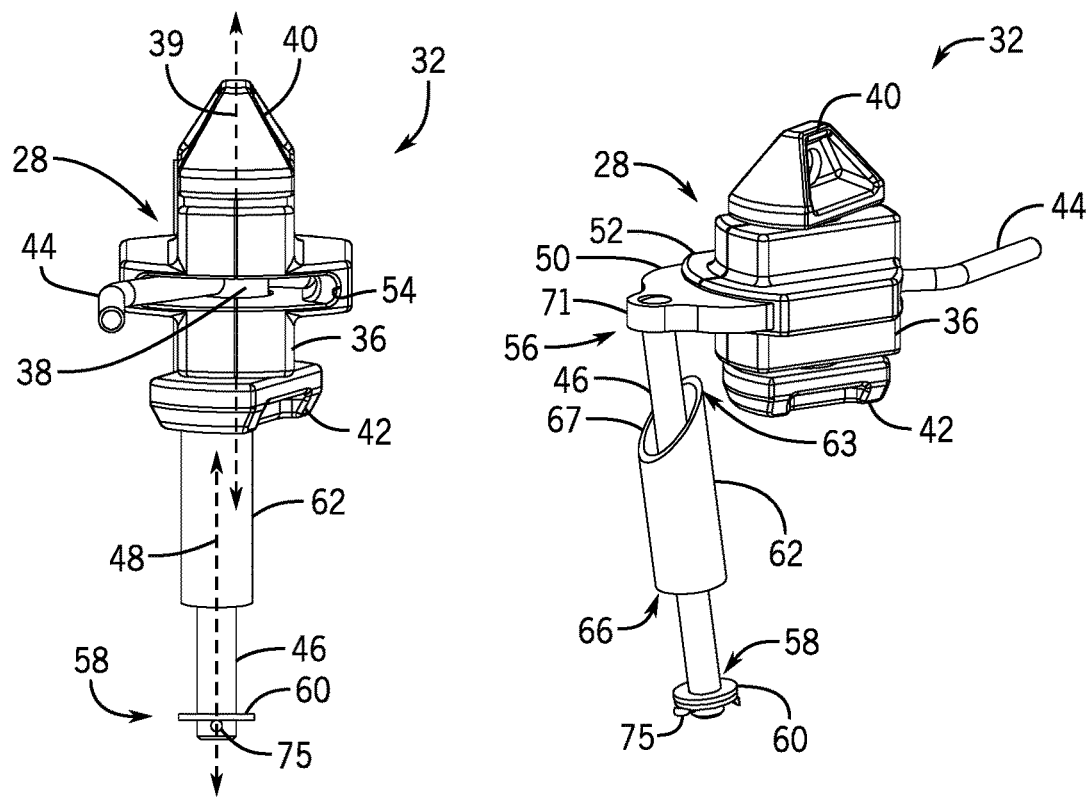
FIGS. 3A and 3B illustrate one example of a twistlock assembly according to the present disclosure, where the twistlock assembly is in a first position.

Referring to FIGS. 3A and 3B, the twistlock assembly 32 comprises a twistlock 28 having a housing 36. A center shaft 38 runs through the housing 36 and supports a first twistable member 40 on a top end thereof and a second twistable member 42 on a bottom end thereof. Both the housing 36 and the center shaft 38 extend along a twistlock axis 39. An actuator handle 44 coupled to the center shaft 38 can be used to twist the center shaft 38 and twistable members 40, 42 around the twistlock axis 39, as is known. A pin 46 is coupled to the housing 36 at a location lateral to the twistlock axis 39 and extends along a pin axis 48. More specifically, the housing 36 is coupled to the pin 46 via a bracket 50. The lateral location of the pin axis 48 with respect to the twistlock axis 39, coupled with the horizontally-extending bracket 50, provides clearance between the twistlock 28 and the pin 46. The bracket 50 may be welded to the housing 36 or may be cast as an integral part of the housing 36. In the example, shown, the bracket 50 is coupled to a flanged portion 52 of the housing 36. In other examples, the pin 46 is coupled directly to the housing 36 without using a bracket, which housing 36 may have a larger flanged portion 52 to provide the above-mentioned clearance between the twistlock 28 and pin 46. The actuator handle 44 extends through a slot 54 in an end of the housing 36 that is opposite the flanged portion 52 to allow access to the actuator handle 44 for locking and unlocking the twistable members 40, 42.

As shown, the pin 46 is coupled to the bracket 50 at an upper end 56 thereof; however, the pin 46 could also be coupled to the bracket 50 anywhere along the length of the pin 46. The pin 46 and bracket 50 can be integral with one another, welded to one another, held together by a splined or threaded connection, or connected any other manner known to those having ordinary skill in the art. The connection between the pin 46 and the bracket 50 can be made at a right angle, or can be made at angles other than 90 degrees depending on the orientation of the female fitment with respect to the structural member to which the female fitment is attached. For example, as shown herein, the pin 46 and bracket 50 are provided at less than a 90 degree angle from one another in order to accommodate the less than 90 degree relationship between the vertical face 74 of the stacking unit 26 and the top surface of the female fitment 34 (see FIG. 2, where α<90 degrees).

The twistlock assembly 32 may further comprise a pin supporting member 62 arranged coaxially with the pin 46, and the pin 46 may be slideable along the pin axis 48 with respect to the pin supporting member 62. As shown, the pin supporting member 62 comprises a hollow tube through which the pin 46 extends. The tube has an upper end 63 where the tube has been cut away on a diagonal to form a wide slot 67. The pin 46 is held within the pin supporting member 62 by mechanical stops. For example, referring to FIGS. 4A and 4B, a lower face 65 of the bracket 50 may contact the upper end 63 of the tube of the pin supporting member 62, for example at the location of the slot 67, which contact suspends the pin 46 within the pin supporting member 62 and provides a lower boundary of pin travel. The bracket 50 may also be provided with a tapered end 71 that is connected to the pin 46. The slot 67 at the upper end of the tube is configured to receive the tapered end 71 of the bracket 50 therein (see FIG. 4B). The fit between the tapered end 71 and the slot 67 prevents the twistlock 28 from moving from side-to-side in any significant way when the pin 46 has reached its lowest extent of travel.

A lower end 58 of the pin 46 is also provided with a mechanical stop, such as a flanged portion 60, which may be integral with the pin 46 or may comprise a separate washer-type piece that has been welded or otherwise connected thereto. The pin 46 can only be slid in an upward direction as far as the flanged portion 60 will allow. For example, when the flanged portion 60 contacts a lower end 66 of the pin supporting member 62, this arrests upward sliding of the pin 46 with respect to the tube any further in the upward direction. In one example, a cotter pin 75 may be provided through a hole extending laterally through the pin 46 below the location of the washer-type piece to hold the washer-type piece in place. Alternatively, the flanged portion 60 can be a threaded nut and/or a jam nut, which can be removed from a threaded lower end of the pin 46. The cotter pin 75 and washer-type piece for the threaded nut) can be removed to allow the pin 46 to be removed from the pin supporting member 62 altogether. This allows the pin supporting member 62 to be separately assembled to the shipping unit proximate the female fitment, after which the pin 46 and twistlock 28 can be inserted therein. This also allows removal of the pin 46 and twistlock 28 should either of these parts be damaged.

In some embodiments, damping devices can be provided on the twistlock assembly 32 to prevent excessive noise from raffling or excessive wear from movement between the parts. For example, a washer made of a high-durability, low durometer material (e.g. rubber or other elastomer) could be provided around the pin 46 just below the lower face 65 of the bracket 50 to cushion the bracket 50 when it sits in the slot 67. Alternatively, the washer could sit on top of the pin supporting member 62, and could be slanted at the same angle as the slot 67. A similar washer could be provided just above the flanged portion 60 or on the lower end 66 of the pin supporting member 62 to cushion the contact made therebetween at the upper end of pin travel. A plastic or nylon sleeve could be provided on the inner circumference of the pin supporting member 62 or the outer circumference of the pin 46 to prevent noise and vibration.

Figure 4A:
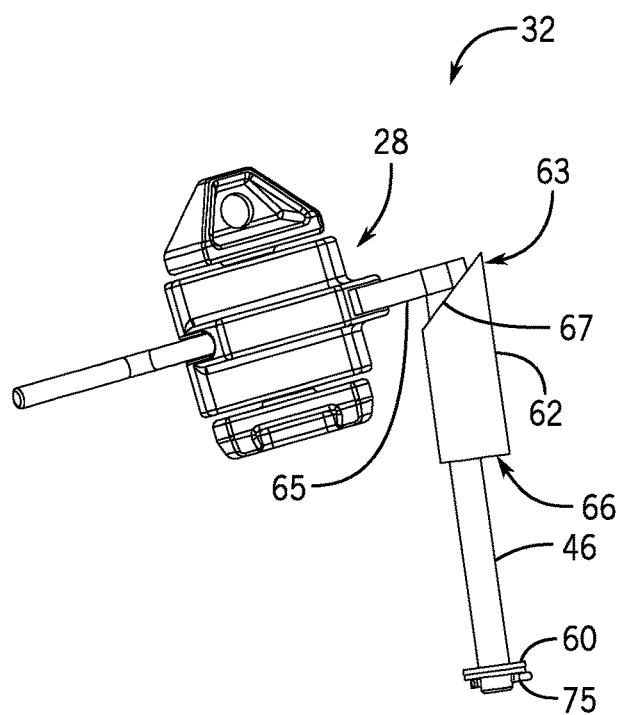
FIGS. 4A and 4B illustrate different views of the twistlock assembly of FIGS. 3A and 3B, where the twistlock assembly is in a second position.
Figure 4B:
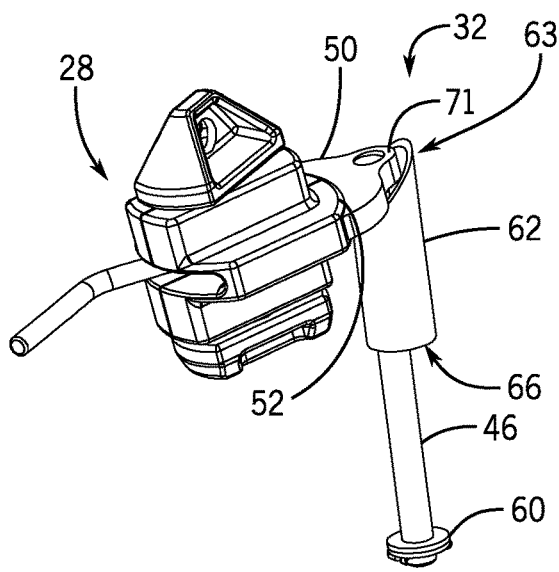

The pin 46 is both axially slidable (along the pin axis 48) and rotatable (around the pin axis 48) with respect to the pin supporting member 62. Comparing FIGS. 3A and 3B with FIGS. 4A and 4B, it can be seen that the pin 46 can be slid up and down along the pin axis 48 with respect to the pin supporting member 62. For example, in FIGS. 3A and 3B, the pin 46 is relatively vertically higher with respect to the pin supporting member 62. In FIGS. 4A and 4B, the pin 46 is relatively vertically lower with respect to the pin supporting member 62, such that the tapered end 71 of the bracket 50 attached to the pin 46 rests in the slot 67 at the upper end 63 of the pin supporting member 62. It can also be seen that the pin 46 can be rotated around the pin axis 48, and that rotation of the pin 46 around the pin axis 48 causes rotation of the twistlock 28 around the pin axis 48. For example, in FIG. 3B, the pin 46 is rotated such that the twistlock 28 is on the higher side of the slot 67 at the upper end 63 of the pin supporting member 62. In FIGS. 4A and 4B, the pin 46 is rotated such that the twistlock 28 is on the lower side of the slot 67 on the upper end 63 of the pin supporting member 62.

Figure 5A:
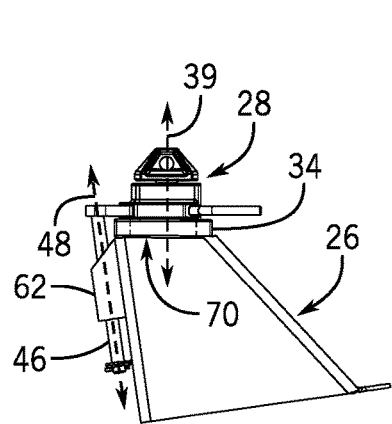
FIGS. 5A-5E illustrate the twistlock assembly of FIGS. 3A, 3B, 4A, and 4B coupled to a stacking unit and in various positions with respect to the stacking unit.
Figure 5B:
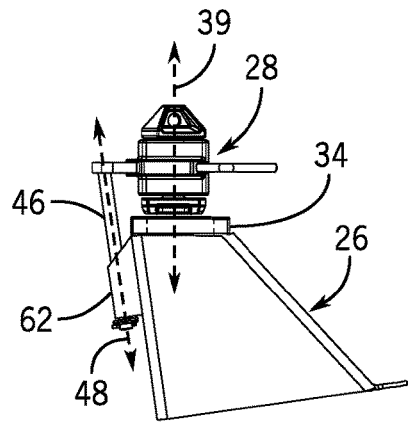
Figure 5C:
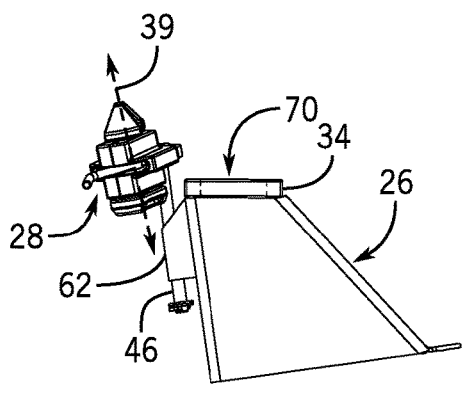
Figure 5D:
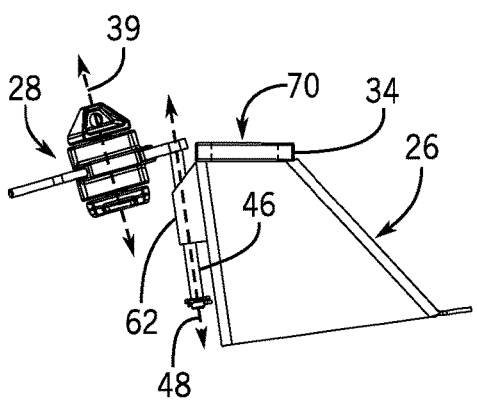
Figure 5E:
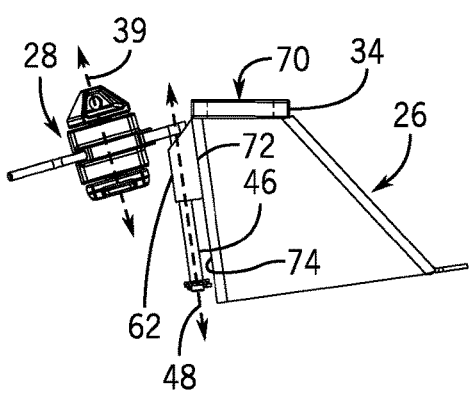

Turning now to FIGS. 5A-5E, the twistlock assembly 32 is shown coupled to the stacking unit 26 proximate the female fitment 34. More specifically, the twistlock assembly 32 is coupled to the stacking unit 26 via the pin supporting member 62. As described with respect to FIGS. 5A-5E, by sliding the pin 46 along the pin axis 48 and rotating the twistlock 28 around the pin axis 48, the twistlock 28 can be moved from a use position in which the twistlock axis 39 is aligned with the aperture 70 (shown in dashed lines, although not actually visible in the side view) and the twistlock 28 is seated on the fitment 34 (FIG. 5A), to a stowed position in which the twistlock axis 39 is located laterally with respect to the aperture 70 and the twistlock 28 is coupled to the shipping unit by way of the pin 46 and the pin supporting member 62 (FIG. 5E). From the use position shown in FIG. 5A, after unlocking the second twistable member 42 from the aperture 70, the pin 46 can be slid up along the pin axis 48 so as to unseat the twistlock 28 from the fitment 34 (see FIG. 5B). The pin 46 can then be rotated around the pin axis 48 in either a clockwise or counterclockwise direction until the twistlock axis 39 is no longer aligned with the aperture 70 of the fitment 34 (see FIG. 5C) The pin 46 can then be both further rotated such that the twistlock 28 is 180 degrees from is initial position, and slid down along the pin axis 48 (see FIG. 5D). The pin 46 can then be slid down all the way to the stowed position, where the tapered end 71 of the bracket 50 sits in the slot 67 (see FIG. 5E).

In the stowed position, the twistlock 28 is located laterally with respect to the female fitment 34 (see FIG. 5E). Further, because the pin supporting member 62 is coupled to the shipping unit lateral to and vertically below the aperture 70 of the fitment 34, the twistlock 28 is able to be stowed lateral to and at least partially vertically below the female fitment 34. This places the twistlock 28 in a location where it will not interfere with a crane inserted into the female fitment 34. The exact relative location of the pin supporting member 62 need not be as shown herein, and the pin supporting member 62 could instead be provided lower down the vertical face 74 of the stacking unit 26. Additionally, it can be seen from FIG. 5A that the clearance between the pin 46 and housing 36 of the twistlock 28 provided by the bracket 50 allows the twistlock 28 to clear the edge of the female fitment 34, while still remaining connected to the pin 46 within the pin supporting member 62. The relative locations of the pin axis 48 and the twistlock axis 39 are therefore designed with this clearance aspect in mind. So too is the angle between the pin 46 and bracket 50 designed to match that between the vertical face 74 and top surface of the female fitment 34.

From the stowed position shown in FIG. 5E, the twistlock 28 can be moved upwardly and again rotated about the pin axis 48 (in the example, by 180 degrees), and then lowered onto the female fitment 34 to the use position in which the twistlock 28 is seated on the female fitment 34 (FIG. 5A). In other words, the sequence shown in FIGS. 5A-5E is repeated in reverse to place the twistlock 28 back in the use position. With the second twistable member 42 aligned with and placed through the aperture 70 in the female fitment 34 (see FIG. 6), the second twistable member 42 can then be twisted via the actuator handle 44 such that it turns at an angle to the aperture 70 provided in the female fitment 34. This rotation of the second twistable member 42 can be accomplished by moving the actuator handle 44 as known. The rotation and angled orientation of the second twistable member 42 with respect to the aperture 70 locks the twistlock 28 to the female fitment 34. Another flatrack 10 can be stacked atop the first flatrack 10 by placing fitments 12 (FIGS. 1A-1B) on top of stacking units 26. The upper flatrack 10 can then be locked to the lower flatrack 10 by rotation of the first twistable member 40 of each twistlock 28 within the downwardly-facing apertures of fitments 12.

Figure 6:
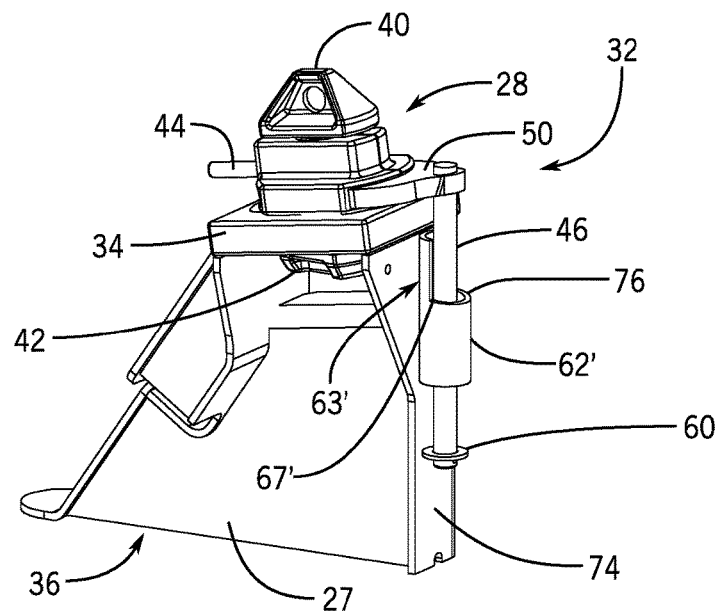
FIG. 6 illustrates another example of a twistlock assembly according to the present disclosure.

FIG. 6 shows another embodiment of a twistlock assembly 32, where all components remain the same as in FIGS. 2-5 except for the pin supporting member. Here, the pin supporting member 62' has a semi-cylindrical portion near its upper end 63 cut away. This forms a slot 67' having a ledge 76 upon which the lower face 65 of the bracket 50 sits when the twistlock 28 is in the stowed position. Therefore, it should be understood that the pin supporting member 62 can take many shapes, and could even be provided without a slot in some examples, depending on its configuration. In another example, not shown herein, the pin supporting member 62 is a rod that is welded via a flange to the stacking unit 26, and the pin 46 is a tube that coaxially surrounds the rod and has a slot through which the flange can be inserted. The pin rides up and down along the rod-type supporting member, and the slot slides along the flange.

Figure 7:
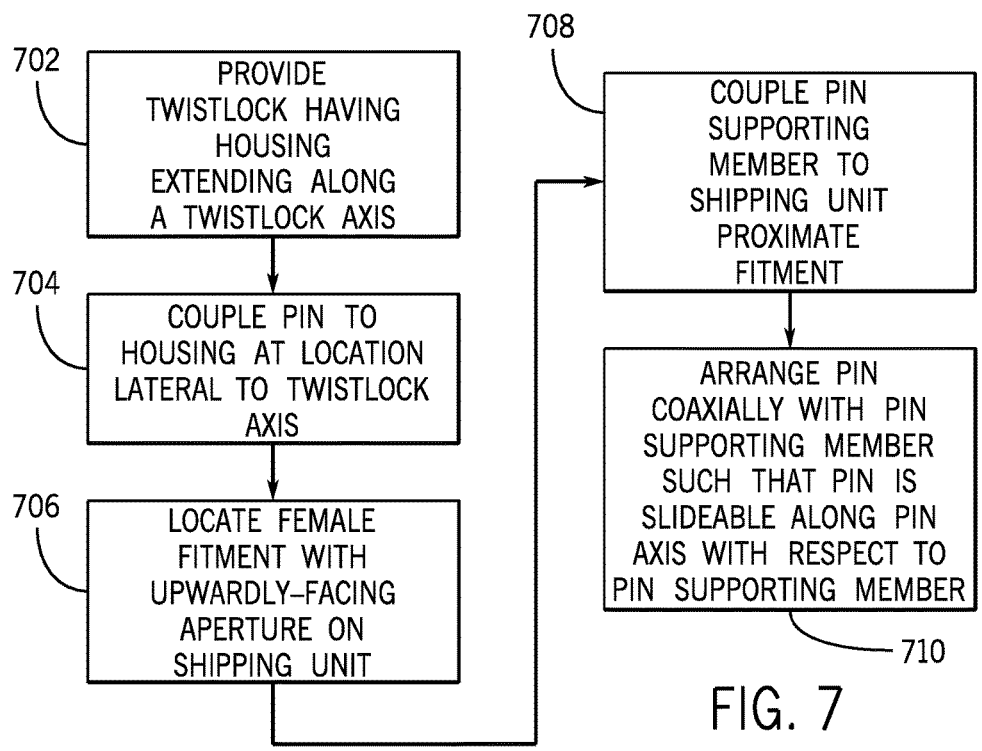
FIG. 7 illustrates a method for coupling a twistlock to a shipping unit.

FIG. 7 illustrates a method for coupling a twistlock 28 to a shipping unit. As shown at 702, the method comprises providing a twistlock 28 having a housing 36 extending along a twistlock axis 39. As shown at 704, the method includes coupling a pin 46 to the housing 36 at a location lateral to the twistlock axis 39, the pin 46 extending along a pin axis 48. As shown at 706, the method includes locating a female fitment 34 having an upwardly-facing aperture 70 on the shipping unit. The method includes coupling a pin supporting member 62 to the shipping unit proximate the fitment 34, as shown at 708. The method also includes arranging the pin 46 coaxially with the pin supporting member 62 such that the pin 46 is slideable along the pin axis 48 with respect to the pin supporting member 62, as shown at 710. As described with respect to FIGS. 5A-5E, by sliding the pin 46 along the pin axis 48 and rotating the twistlock 28 around the pin axis 48, the twistlock 28 can be moved from a use position in which the twistlock axis 39 is aligned with the aperture 70 and the twistlock 28 is seated on the fitment 34, to a stowed position in which the twistlock axis 39 is located laterally with respect to the aperture 70 and the twistlock 28 is coupled to the shipping unit by way of the pin 46 and the pin supporting member 62.

It should be understood that the method described above need not be carried out in the order shown in FIG. 7 or detailed herein. It should also be understood that additional beginning, ending, or intermediate method steps could be added, such as but not limited to: providing the pin supporting member 62 as a tube, and inserting the pin 46 through the tube; providing a bracket 50 that couples the housing 36 to the pin 46, wherein contact between a lower face 65 of the bracket 50 and an upper end 63 of the tube suspends the pin 46 within the tube; connecting a tapered end 71 of the bracket 50 to the pin 46, and providing the upper end 63 of the tube with a slot 67 that is configured to receive the tapered end 71 of the bracket 50 therein; coupling a mechanical stop to a lower end of the pin, wherein contact between the mechanical stop and a lower end 66 of the tube arrests upward sliding of the pin 46 with respect to the tube; and/or coupling the pin supporting member 62 to the shipping unit lateral to and vertically below the aperture 70 of the fitment 34.

Providing the pin supporting member 62 and pin 46 to couple the twistlock 28 to the shipping unit ensures that the twistlock 28 will not be lost when it is not in use. Additionally, the simple sliding and rotation required along and about the pin axis 48 are easily accomplishable maneuvers for an operator who is handling the twistlock assembly 32. Further, the twistlock assembly 32 is able to be easily coupled to an already-existing shipping unit, without requiring complicated retrofitting of the shipping unit. For example, the pin supporting member 62 could be welded or bolted to an existing structural member of a shipping unit near a female fitment provided thereon. For example, see weld 72 provided between pin supporting member 62 and a vertical face 74 of stacking unit 26, shown in FIG. 5E. Alternatively, the pin supporting member 62 may be integral with the shipping unit, such as integrally molded with the vertical face 74 of the stacking unit 26. Coupling the twistlock 28 to the shipping unit itself, and providing the mechanical stops at the lower face 65 of the bracket 50 and at flanged portion 60 provided about the pin 46 also prevents loss, theft, or inadvertent ejection of the twistlock 28, which could result in a safety issue.

Other benefits of the twistlock assembly 32 are that the user of the twistlock 28 is able to remove the twistlock 28 from the female fitment 34 when necessary, yet maintain it firmly in close proximity to its intended usage point. All movement of the twistlock 28 to and from the stowed and use positions can be accomplished while the twistlock 28 remains coupled to the pin supporting member 62 via the pin 46. Additionally, the twistlock assembly 32 is easy to use, has reduced interference with components that may be needed for stacking and/or lifting, and maintains an upward orientation of the first twistable member 40 at all times.

This written description uses examples of the present disclosure, including the best mode, and enables any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A twistlock assembly comprising:
a twistlock having a housing extending along a twistlock axis;
a pin coupled to the housing at a location lateral to the twistlock axis, the pin extending along a pin axis; and
a pin supporting member arranged coaxially with the pin, the pin being slideable along the pin axis with respect to the pin supporting member;
wherein the pin supporting member is configured to be coupled to a shipping unit proximate a female fitment located thereon and having an upwardly-facing aperture;
wherein, by sliding the pin along the pin axis and rotating the twistlock around the pin axis, the twistlock can be moved from a use position in which the twistlock axis is aligned with the aperture and the twistlock is seated on the fitment, to a stowed position in which the twistlock axis is located laterally with respect to the aperture and the twistlock is coupled to the shipping unit by way of the pin and the pin supporting member;
wherein the pin is also rotatable with respect to the pin supporting member, and rotation of the pin around the pin axis causes rotation of the twistlock around the pin axis; and
wherein from the use position, the pin can be slid up along the pin axis so as to unseat the twistlock from the fitment, then rotated around the pin axis until the twistlock axis is no longer aligned with the aperture of the fitment, and then slid down along the pin axis to the stowed position.

2. The assembly of claim 1, wherein the pin supporting member comprises a tube through which the pin extends.

3. The assembly of claim 2, further comprising a bracket that couples the housing to the pin, wherein contact between a lower face of the bracket and an upper end of the tube suspends the pin within the tube.

4. The assembly of claim 3, wherein the bracket has a tapered end that is connected to the pin, and the upper end of the tube has a slot that is configured to receive the tapered end of the bracket therein.

5. The assembly of claim 3, further comprising a mechanical stop located at a lower end of the pin, wherein contact between the mechanical stop and a lower end of the tube arrests upward sliding of the pin with respect to the tube.

6. The assembly of claim 1, wherein the pin supporting member is coupled to the shipping unit lateral to and vertically below the aperture of the fitment.

7. The assembly of claim 1, wherein the shipping unit is a collapsible intermodal flatrack.

8. The assembly of claim 7, further comprising a stacking unit that projects from a collapsible post of the intermodal flatrack, wherein the fitment is coupled to the stacking unit.

9. A twistlock assembly comprising:
a twistlock having a housing extending along a twistlock axis;
a pin coupled to the housing at a location lateral to the twistlock axis, the pin extending along a pin axis;
a pin supporting member arranged coaxially with the pin, the pin being slideable along the pin axis with respect to the pin supporting member, wherein the pin supporting member comprises a tube through which the pin extends; and
a bracket that couples the housing to the pin, wherein contact between a lower face of the bracket and an upper end of the tube suspends the pin within the tube;
wherein the bracket has a tapered end that is connected to the pin, and the upper end of the tube has a slot that is configured to receive the tapered end of the bracket therein;
wherein the pin supporting member is configured to be coupled to a shipping unit proximate a female fitment located thereon and having an upwardly-facing aperture; and
wherein, by sliding the pin along the pin axis and rotating the twistlock around the pin axis, the twistlock can be moved from a use position in which the twistlock axis is aligned with the aperture and the twistlock is seated on the fitment, to a stowed position in which the twistlock axis is located laterally with respect to the aperture and the twistlock is coupled to the shipping unit by way of the pin and the pin supporting member.

10. The assembly of claim 9, wherein the pin supporting member is coupled to the shipping unit lateral to and vertically below the aperture of the fitment.

11. The assembly of claim 9, wherein the shipping unit is a collapsible intermodal flatrack.

12. The assembly of claim 11, further comprising a stacking unit that projects from a collapsible post of the intermodal flatrack, wherein the fitment is coupled to the stacking unit.

13. The assembly of claim 9, wherein the pin is also rotatable with respect to the pin supporting member, and rotation of the pin around the pin axis causes rotation of the twistlock around the pin axis.

14. The assembly of claim 13, wherein from the use position, the pin can be slid up along the pin axis so as to unseat the twistlock from the fitment, then rotated around the pin axis until the twistlock axis is no longer aligned with the aperture of the fitment, and then slid down along the pin axis to the stowed position.

15. A twistlock assembly comprising:
a twistlock having a housing extending along a twistlock axis;
a pin coupled to the housing at a location lateral to the twistlock axis, the pin extending along a pin axis;
a pin supporting member arranged coaxially with the pin, the pin being slideable along the pin axis with respect to the pin supporting member, wherein the pin supporting member comprises a tube through which the pin extends;
a bracket that couples the housing to the pin, wherein contact between a lower face of the bracket and an upper end of the tube suspends the pin within the tube; and
a mechanical stop located at a lower end of the pin, wherein contact between the mechanical stop and a lower end of the tube arrests upward sliding of the pin with respect to the tube;
wherein the pin supporting member is configured to be coupled to a shipping unit proximate a female fitment located thereon and having an upwardly-facing aperture; and
wherein, by sliding the pin along the pin axis and rotating the twistlock around the pin axis, the twistlock can be moved from a use position in which the twistlock axis is aligned with the aperture and the twistlock is seated on the fitment, to a stowed position in which the twistlock axis is located laterally with respect to the aperture and the twistlock is coupled to the shipping unit by way of the pin and the pin supporting member.

16. The assembly of claim 15, wherein the pin supporting member is coupled to the shipping unit lateral to and vertically below the aperture of the fitment.

17. The assembly of claim 15, wherein the shipping unit is a collapsible intermodal flatrack.

18. The assembly of claim 17, further comprising a stacking unit that projects from a collapsible post of the intermodal flatrack, wherein the fitment is coupled to the stacking unit.

19. The assembly of claim 15, wherein the pin is also rotatable with respect to the pin supporting member, and rotation of the pin around the pin axis causes rotation of the twistlock around the pin axis.

20. The assembly of claim 19, wherein from the use position, the pin can be slid up along the pin axis so as to unseat the twistlock from the fitment, then rotated around the pin axis until the twistlock axis is no longer aligned with the aperture of the fitment, and then slid down along the pin axis to the stowed position.

* * * * *